Aug. 11, 1959     G. O. SINEX     2,899,014
GAS AND LIQUID SEPARATING APPARATUS
Filed March 4, 1957
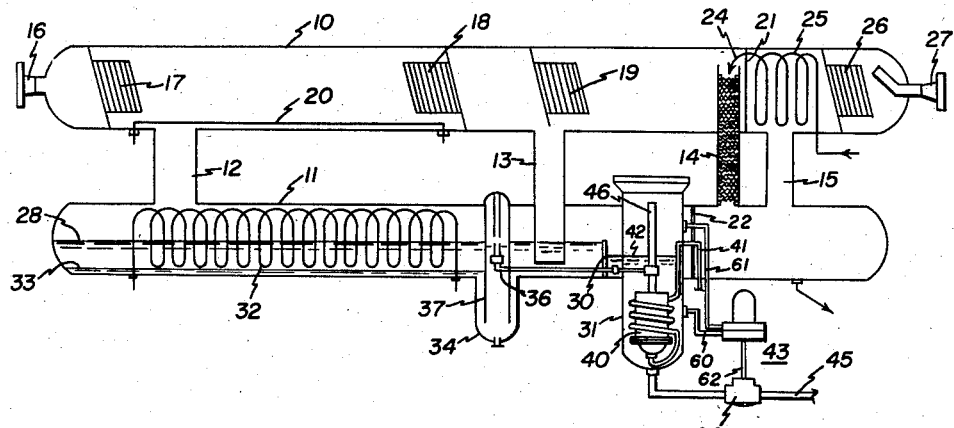
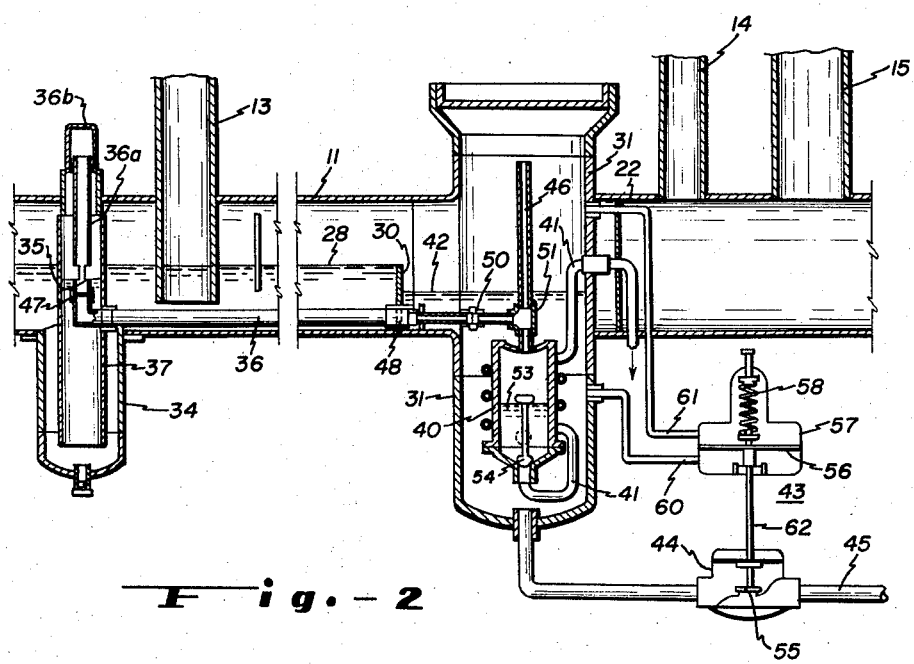
*INVENTOR.*
Gene O. Sinex
BY
ATTORNEYS

United States Patent Office 2,899,014
Patented Aug. 11, 1959

2,899,014

GAS AND LIQUID SEPARATING APPARATUS

Gene O. Sinex, Farmington, N. Mex., assignor to American Tank and Steel Corporation, Farmington, N. Mex., a corporation of New Mexico Application March 4, 1957, Serial No. 643,569

7 Claims. (Cl. 183—2.7)

This invention relates to gas and liquid separation apparatus such as that employed in petroleum gas treatment and more particularly to such apparatus for separating two liquid components from a gas and from each other.

Petroleum gas supplied from a well may contain substantial quantities of entrained liquids, including oil and water, which must be removed before transmission or use of the gas. Mechanical scrubbers and absorption-type dehydrators are usually employed for separating liquid from the gas for drying the gas. The liquid components of different specific gravities may be separated by a multiphase gravity separator. Because the petroleum gas treating equipment may be operated outdoors in cold weather where the separated water may be subject to freezing, it is desirable to provide arrangements for minimizing the likelihood of such freezing, and various arrangements have been suggested for this purpose. It is an object of the present invention to provide a water and liquid hydrocarbon separator including an improved arrangement for preventing the freezing of the separated water during cold weather.

It is another object of this invention to provide an improved three-phase separator for the treatment of petroleum gas and the like.

Briefly, in carrying out the objects of this invention in one embodiment thereof, a three-phase gas and liquid separator is provided for use in connection with a petroleum gas treating apparatus comprising upper and lower horizontal cylinders connected in communication. The upper cylinder is provided with gas scrubbing units for removing liquid particles from the gas and this separated liquid is conducted to the lower cylinder through passages provided for this purpose; the separated gas is dried and water vapor removed therefrom in a dehydrating equipment arranged at the ends of the two cylinders. The separated liquids collect in the lower cylinder and stratify in accordance with their respective gravities, the water collecting in the lower layer. In order to separate the lighter liquids such as oils from the water, a first sump is provided which collects only water and a second sump which collects the oils. The level of the oil in the second sump is controlled by a so-called floatless liquid level controller; oil is discharged from the sump whenever its level exceeds a predetermined value. While a certain amount of heat may be supplied to the liquids collecting in the lower cylinder, complications may arise during cold weather which make it desirable to conduct the water a substantial distance away from the apparatus before it is discharged and may freeze. In order to control the discharge of water from the apparatus, a float chamber is provided within the second sump and is maintained warm by the surrounding oil or other liquid, and water overflowing from the first sump is conducted into the float chamber and is discharged therefrom by a float control within the chamber after a predetermined amount of water has collected. This apparatus has been found particularly suited to the maintenance of operation of three-phase separating systems which are required to work in below freezing temperatures.

The features of novelty which characterize this invention are pointed out in the appended claims. The invention itself, however, together with further objects and advantages thereof will be better understood from the following description taken in connection with the accompanying drawing, in which:

Fig. 1 is a diagrammatic view of a petroleum gas dehydrating system provided with a three-phase gas and liquid separator embodying the invention; and Fig. 2 is an enlarged detail view of the liquid separating control of the device of Fig. 1.

The petroleum gas treating apparatus shown in Fig. 1 comprises upper and lower horizontal cylinders 10 and 11 connected by four vertical conduits 12, 13, 14 and 15. Petroleum gas to be treated enters the upper cylinder 10 through an inlet connection 16 under a pressure of, say, 800 pounds per square inch, passes in succession over three gas scrubbers 17, 18 and 19; the scrubbers separate liquid particles from the gas and the liquid falls to the bottom of the cylinder 10 and passes through the conduits 12 and 13 into the lower cylinder 11. A heater 20 is provided in the cylinder 10 between the scrubbers 17 and 18 at the bottom of the cylinder in order to supply sufficient heat to prevent the solidification of liquid therein. The chamber 10 is divided into two chambers by a partition 21 and the cylinder 11 is divided into two chambers by a partition 22. The chambers to the right of the partitions 21 and 22 are connected by the vertical passage 15 and constitute a gas dehydrating section into which the gas from the cylinder 10 is directed through the vertical connection 14; the connection 14 is filled with a packing material such as discs of expanded metal, and a dehydrating agent such as diethylene glycol is sprayed over the packing from a pipe 24 having a coil portion 25 in heat transfer relationship with the gas in the chamber to the right of the partition 21. The gas passes upwardly through the conduit 15 over the surface of the heat transfer coil 25 and out through a scrubber 26 to an outlet connection 27 by which it is removed from the apparatus.

The liquid separated from gas in the cylinder 10 flows into the cylinder 11 and collects to a level indicated at 28 and determined by the height of a baffle partition 30 over which excess liquid flows into a sump or reservoir 31. In order to prevent the solidifying of liquids within the cylinder 11 during their separation by gravity, and also to aid in the dissolution and separation of any oil-water emulsions, the liquid in the cylinder is heated by a coil or tube heat exchanger 32 through which warm liquid is circulated. The liquid circulated through the tube 32 may, for example, be heated diethylene glycol supplied from a concentrating apparatus for the weak glycol resulting from the dehydrating operation in the right-hand chambers of the cylinders 10 and 11.

During the separation of liquids by gravity, water settles to the bottom of the cylinder 11 and will be maintained at some level such as that indicated at 33. The water fills a sump 34 and rises to a level in the sump determined by the position of a discharge outlet 35 provided in a water discharge line 36. The opening 35 lies within a discharge trap or bell 37 and the water can rise in the trap 37 to a level determined by the combined heights of water and oil or other liquid, this height being somewhat less than the level 28 because of the higher specific gravity of the water. The water thus discharged from the body of liquid within the cylinder 11 passes through the discharge conduit 36 to a float valve chamber 40 comprising a closed vessel mounted centrally and in spaced relationship to the walls of the sump 31. The chamber 40 is provided with a float-controlled discharge valve and discharges water through an outlet line 41 whenever the level rises above a predetermined value. The line 41 may be coiled about the chamber 40, as shown, to provide an additional length of the outlet line subject to heating; this also assures that heat is available for offsetting the cooling effects should a gas leak occur so that gas is expanded at the float valve outlet. The sump 31 is maintained filled with warm liquid flowing over the weir 30 to a predetermined level above the chamber 40 as indicated at 42. The control for maintaining the level 42 has been shown as a so-called "floatless" level control indicated at 43 and which effects operation of a discharge valve 44 to discharge petroleum liquids from the sump 31 whenever the level 42 rises above a predetermined value; the oil is discharged through a conduit 45 to a suitable utilization, storage or collection equipment (not shown). The petroleum liquids flowing over the weir 30 and into reservoir 31 are maintained relatively warm by heat supplied through the coil 32; this warm liquid surrounds the float chamber 40 and maintains the water within the float chamber and around the valve therein well above freezing thereby assuring that the water will not be cooled below its freezing temperature within the apparatus. Furthermore, this arrangement provides sufficient heat to allow the water to be transmitted for substantial distances through the discharge conduit 41 without danger of freezing before it is discharged. A pressure-equalizing or vent tube 46 is provided in communication with the chamber 40 and opens into the cylinder 11 near the top portion within the upper end of the sump 31.

The details of construction and arrangement of the parts of the water collecting device arranged in the sump 34 and the oil collecting and water discharge device arranged in the sump 31 will be more easily understood from the diagrammatic illustration of Fig. 2. As shown in this figure, the water outlet 35 from the sump 34 is provided in an upper extension 36a of the conduit 36 and is connected to the conduit by a threaded sleeve 47. It will readily be apparent that the height of the water level within the trap 37 may be changed by removing an access cover 36b when the system is not under pressure and adjusting the position of the conduit section 36a or by replacing this conduit with another conduit having the opening 35 in a different position. The water discharge conduit 36 passes along the bottom of the cylinder 11 through a coupling 48 mounted in the weir 30; the water is directed from the conduit 36 through a coupling 50 and a T-connection 51 to the conduit 46 and thence to the float chamber 40. Oil flowing over the weir 30 collects in the sump 31 to some level such as that indicated at 42, this level being determined by the float control apparatus 43. The water collects in the float chamber 40 until a float 53 therein rises and pulls a valve 54 away from its seat at the bottom of the float chamber to allow the water to be discharged through the conduit 41 until the float falls sufficiently to again close the valve 54. The water collecting in the float chamber 40 is maintained at a relatively high temperature by the warm oil within the sump 31 so that freezing is prevented; and, furthermore, so that the water discharged through the pipe 41 is at a sufficiently high temperature to prevent its freezing even when it passes through a substantial length of pipe after leaving the sump 31. In this manner the discharged water may be led a substantial distance away from the apparatus before it is discharged to the outdoors where it may be frozen. The freezing of the water within the separating apparatus is thus prevented and interruption of the operation due to freezing is avoided.

The discharge of oil from the sump 31 is effected under control of a valve 55 in the control valve mechanism 44. The valve control is of the so-called "floatless' type and comprises a diaphragm 56 mounted within a casing 57 and bias to its lower position by an adjustable valve spring 58. The diaphragm 56 divides the casing 57 into two separate fluid compartments, the lower compartment of the casing 57 is connected by a tube 60 to the sump 31 below the level of liquid therein. The upper chamber of the casing 57 is connected by a tube 61 to the sump 31 above the level of liquid therein. The resultant pressure on the diaphragm 56 is thus the difference between the liquid pressure and the gas pressure in the chamber 31, and the diaphragm will take a position dependent upon the level 52 of the liquid. When the liquid rises sufficiently, the diaphragm 56 moves upwardly against the spring 58 and lifts the valve 55 from its seat through a connection illustrated diagrammatically as a rod 62. This unseats the valve 55 and allows liquid to flow from the sump 31 until its level 52 is sufficiently low to cause downward movement of the diaphragm 56 and the consequent closing of the valve 55. The operation of the control 43 is such as to maintain the level 52 of the oil within the sump 31 always above the top of the float valve chamber 40 and thus the temperature of the float valve chamber is maintained substantially at that of the oil within the sump 31.

While this invention has been described in connection with a particular type of petroleum gas treating apparatus, other applications and arrangements will occur to those skilled in the art. Therefore, it is not desired that the invention be limited to the specific apparatus illustrated and described, and it is intended by the appended claims to cover all modifications which fall within the spirit and scope of the invention.

I claim:

1. In a gas and multi-liquid separating system wherein the gas is separated from the liquid and the heavier and lighter components of the liquid are separated from one another, means providing a closed chamber having a gas inlet and a gas outlet, scrubbing means between said inlet and outlet for removing entrained liquid from the gas stream, means providing a reservoir for collecting the separated liquid and for affording stratification of the heavier and lighter components of the liquid by gravity, means providing a sump below said collecting reservoir, a closed vessel mounted within said sump and spaced from the walls thereof, inverted siphon means connected in communication with said vessel for conducting the heavier component from said collecting reservoir to said vessel, means for discharging the heavier component from said vessel upon accumulation thereof above a predetermined level, means for conducting the lighter component from said collecting reservoir to said sump, and automatic liquid level control means for controlling the discharge of the lighter component from said system and for maintaining a predetermined level of the lighter component in said sump about said vessel.

2. In a petroleum gas treating system wherein oil and water in a liquid state are separated from gas and from one another, means providing a closed chamber having a gas inlet and a gas outlet, scrubbing means between the inlet and outlet for removing entrained water and oil from the gas stream, means providing a reservoir for collecting the separated oil and water and for stratifying the oil and water by gravity, means providing a sump below said collecting reservoir, a closed vessel mounted within said sump and spaced from the walls thereof, means for conducting water from said collecting reservoir to said vessel, means dependent upon the accumulation of water in said vessel for discharging water therefrom and for conducting the water outside said system, means for conducting oil from said collecting reservoir to said sump, and means arranged to control the discharge of oil from said sump for maintaining a predetermined level of oil in said sump about said vessel.

3. A petroleum treating system as set forth in claim 2 wherein said closed chamber means comprises an upper cylinder and a lower cylinder and interconnecting conduits, said lower cylinder constituting said reservoir for collecting the separated oil and water, and means for heating the oil and water in said lower cylinder.

4. A petroleum gas treating system as set forth in claim 2 wherein the means for conducting the water to said vessel comprises an adjustable siphon having its inlet positioned to determine the level of the water-oil interface in said collecting reservoir.

5. A gas treating system as set forth in claim 3 including means for heating the lower portion of said upper chamber to prevent the accumulation of solidified hydrocarbons therein.

6. A petroleum gas treating system as set forth in claim 3 wherein said means for discharging water from said vessel and outside said system includes a conduit having a portion formed to provide a coil within said sump and around said vessel for supplying heat to the fluid discharged from said vessel.

7. In a petroleum gas treating system or the like wherein a first liquid and a heavier second liquid are accumulated, means for collecting the two liquids and for stratifying them by gravity, sump means below said collecting means, means for conducting the separated first liquid from said collecting means to said sump means, a closed vessel mounted within said sump means and spaced from the walls thereof, means for conducting the heavier liquid from said collecting means to said vessel, means dependent upon the accumulation of the heavier liquid in said vessel for discharging the heavier liquid therefrom and for conducting it outside said system, and means arranged to control the discharge of the first liquid from said sump means for maintaining a predetermined level of the first liquid in said sump means about said vessel.

References Cited in the file of this patent
UNITED STATES PATENTS

| | | |
|---|---|---|
| 2,619,187 | Hayes et al. | Nov. 25, 1952 |
| 2,657,760 | Glasgow | Nov. 3, 1953 |
| 2,762,511 | Sternaman | Sept. 11, 1956 |